UNITED STATES PATENT OFFICE 2,466,445

REACTION PRODUCT OF A POLYHYDROXYL ALCOHOL WITH A TRIVALENT METAL SULFATE

Milton Landau, New York, N. Y.

No Drawing. Application December 13, 1946,
Serial No. 716,179

2 Claims. (Cl. 260—438)

This invention relates to inorganic resinous compositions in the form of salts of trivalent metals in which water of crystallization is replaced at least in part by organic material such, for example, as dibasic alcohols. It is herein illustrated in some detail as embodied in viscous liquid resin-like substances carrying the sulfate of chromium or the sulfate of aluminum or the sulfate of iron, that is, metals which form alums or other alum-type salts.

The alcohol-carrying sulfates of the present invention vary in solubility. Some of them are insoluble in several organic solvents, although their permanent and stable resinous form enables them to serve as softeners, flexibilizers and sizes for textiles, or as ingredients of such sizes and softeners. Thus they are not removed or injured by many dry-cleaning procedures. In addition the present invention provides readily miscible and stable astringents, fire retardants, clarifiers and tanning agents.

Other features and advantages will hereinafter appear.

Aluminum sulfate hydrate (carrying $18H_2O$) was heated slowly with an equal weight of ethylene glycol with constant stirring until boiling at a temperature of about 120 degrees C. Boiling was continued until the final product weighed about 75% of the combined original weights, yielding a very viscous, water-white liquid of specific gravity of about 1.2, with a pH in 5% aqueous solution of about 5, soluble in hot water, hot ethylene glycol, hot glycerol, hot diethylene glycol, but insoluble in ethyl alcohol, mineral oil, petroleum benzine, benzol, olive oil or raw linseed oil.

Technical aluminum sulfate yields a milk-white viscous resinous liquid, which may be made clear if the sulfate is dissolved in dilute acid, mixed with ethylene glycol, and then gently boiled to the desired consistency.

When diethylene glycol or glycerol was substituted for the ethylene glycol and the mixture boiled down to 88% of the original mixed materials, a similar product was obtained having similar properties.

Triethylene glycol was substituted for ethylene glycol and heating continued down to 85% of the original combined weights. The cooled product was yellowish, slightly odorous, specific gravity about 1.3; other properties substantially the same as for ethylene glycol.

Propylene glycol was substituted for ethylene glycol and heating continued down to 77% of the original combined weights. The cooled product was water white, with an ethereal odor, specific gravity about 1.4; other properties substantially the same as for ethylene glycol.

Aluminum sulfate was dissolved in a minimum of boiling water and sorbitol added equal in weight to the sulfate. The solution was boiled gently with constant stirring until the product weighed 97% of the original combined weights of sulfate and sorbitol. The cooled product was highly viscous (like tar), brown in color, slight caramel odor, specific gravity about 1.9, solubilities as for ethylene glycol-aluminum sulfate resin.

Aluminum sulfate hydrate was dissolved in a minimum of boiling water and mannitol added equal to one half the weight of the sulfate. The solution was boiled gently with constant stirring until the product weighed 98% of the original combined weights of sulfate and mannitol. The cooled product was highly viscous, water white in color, slight ethereal odor, specific gravity about 1.6, soluble in hot water, hot ethylene glycol, hot glycerol; but insoluble in diethylene glycol, ethyl alcohol, mineral oil, benzine, benzol, olive oil, or raw linseed oil.

Ammonia alum (ammonium aluminum sulfate carrying $12H_2O$) added to one-third of its weight of ethylene glycol and heated gently with constant stirring until the product weighed 77% of the combined weights of the materials yielded a very viscous, water-white, slightly clouded, odorless material of a specific gravity of about 1.3. The 5% aqueous solution had a pH of about 5. It was soluble in hot water, hot ethylene glycol, hot glycerol, but insoluble in diethylene glycol, ethyl alcohol, mineral oil, petroleum benzine, benzol, olive oil or raw linseed oil.

When glycerol was substituted for the glycol with ammonia alum and the evaporation continued to 82% of original weights, a product was obtained of substantially the same properties.

Crystalline ammonium chromium sulfate (carrying $12H_2O$) was added to an equal weight of ethylene glycol and gently boiled with constant stirring at about 130 degrees C. until the product weighed about 61% of the combined original weights. The cooled product was a very viscous dark green odorless liquid with a specific gravity of about 1.4, and a pH in 5% aqueous solution of about 4.5.

It was soluble in hot water, hot ethylene glycol, hot glycerol, slightly soluble in hot diethylene glycol or hot ethyl alcohol, and insoluble in mineral oil, petroleum benzine, benzol, or raw linseed oil or olive oil.

When glycerol was substituted for glycol with the ammonium chromium sulfate and evaporated at about 115 degrees C. to 84% of the original combined weights, the product had substantially the same properties.

Crystalline chromic sulfate (carrying $15H_2O$) was dissolved in a minimum of boiling water and ethylene glycol added in ratio of 1 to 1 of the sulfate, and the final solution boiled gently at 106 degrees C. with constant stirring until the final product weighed 78% of the original combined weights of sulfate and glycol. The cooled product was very viscous, dark green, odorless, specific gravity about 1.4, pH in 5% aqueous solution about 4.5, soluble in hot water, slightly soluble in hot ethylene glycol, hot glycerol, but insoluble in ethyl alcohol, mineral oil, benzine, benzol, olive oil, or raw linseed oil.

Potassium chromium sulfate (carrying $12H_2O$) was dissolved in a minimum of boiling water and ethylene glycol added in the ratio of 1 to 1 of the sulfate. The solution was boiled gently at 103 degrees C. with constant stirring until the final product weighed 90% of the original combined weights of sulfate and glycol. The cooled product had substantially the same properties as the chromic sulfate.

If any of these resins are too viscous, water may be added and gentle boiling and stirring continued until the desired consistency is obtained.

Ferric sulfate hydrate (carrying $9H_2O$) was added to an equal weight of ethylene glycol and gently heated with constant stirring at a boiling temperature of about 120 degrees C. Evaporation was continued until the final product weighed 83% of the combined original weights. The precipitate first formed during this process disappeared during the final stage of evaporation. The cooled product was very viscous, dark brown, odorless, specific gravity about 1.6, soluble in cold water, hot ethylene glycol, hot diethylene glycol, hot glycerol, hot ethyl alcohol; decomposed by hot water; insoluble in benzine, benzol, mineral oil, olive oil, raw linseed oil.

Glycerol was substituted for ethylene glycol in the foregoing process and evaporation continued down to 97% of the original combined weights. The final product had substantially the same properties.

Ferric ammonium sulfate (ferric alum carrying $12H_2O$) was added to an equal weight of ethylene glycol and heated gently with constant stirring at a boiling temperature of about 120 degrees C. Evaporation was continued until the final product weighed 62% of the original combined weights. The precipitate first formed during this process disappeared during the final stage of evaporation. The cooled product was viscous, dark brown, odorless, specific gravity about 1.5, soluble in hot ethylene glycol, hot diethylene glycol, and hot glycerol; slightly soluble in hot ethyl alcohol; decomposed by hot water; insoluble in benzine, benzol, mineral oil, olive oil, raw linseed oil.

The sorbitol and mannitol are easily available commercially and carry six hydroxyl groups. The glycerine carries three groups.

Moreover, the foregoing compositions of matter described as soluble in hot glycol, hot glycerol, or hot diethylene glycol were not readily soluble in the corresponding cold polyalcohol. Thus the compositions of matter were different from solutions of solids in the polyalcohols. Colloidization is probable.

Sometimes it was found useful to mix two of the resinous liquids. Sometimes it is possible to push evaporation to obtain a glassy resin-like mass.

Having thus described certain embodiments of the invention, what is claimed is:

1. The product obtained by heating a mixture comprising essentially a polyhydroxyl alcohol containing not more than six hydroxyl groups, consisting of carbon, hydrogen and oxygen, the oxygen being selected from the group of ether oxygen and hydroxyl oxygen, and also comprising essentially a sulfate selected from the class consisting of the trivalent sulfates of aluminum, chromium and iron and their respective alums with the sulfates of the alkali metals and ammonium, said product being a viscous material weighing less than the sum of the initial weights of said polyhydroxyl alcohol and said sulfate, and not being readily soluble in said polyhydroxyl alcohol when cold.

2. The product obtained by heating a mixture comprising essentially ethylene glycol and about an equal weight of aluminum sulfate, said product being a viscous material weighing less than the sum of the initial weights of said glycol and said sulfate, and not being readily soluble in said glycol when cold.

MILTON LANDAU.

REFERENCES CITED

The following references are of record in the file of this patent:

UNITED STATES PATENTS

| Number | Name | Date |
|---|---|---|
| 1,513,233 | Fant | Oct. 28, 1924 |
| 2,084,261 | Boughton et al. | June 15, 1937 |
| 2,114,985 | Schuler | Apr. 19, 1938 |
| 2,223,349 | Bremer | Dec. 3, 1940 |
| 2,255,515 | Popper | Sept. 9, 1941 |

OTHER REFERENCES

Gomer et al., "Jour. Am. Chem. Soc.," vol. 66 (1944), pp. 1331–1333.

Grun, "Ber. deutsch. chem. Ges.," vol. 43 (1910), pp. 1051–1052.

Mellor, "Modern Inorganic Chemistry" (Rev. ed. 1939), pp. 670–671.

Grun et al., "Ber. deut. Chem. Ges.," vol. 41, pages 3465–3477 (1908).